G. W. PARSONS.
TRENCH EXCAVATOR.
APPLICATION FILED SEPT. 25, 1906.
906,655.
Patented Dec. 15, 1908.
5 SHEETS—SHEET 4.
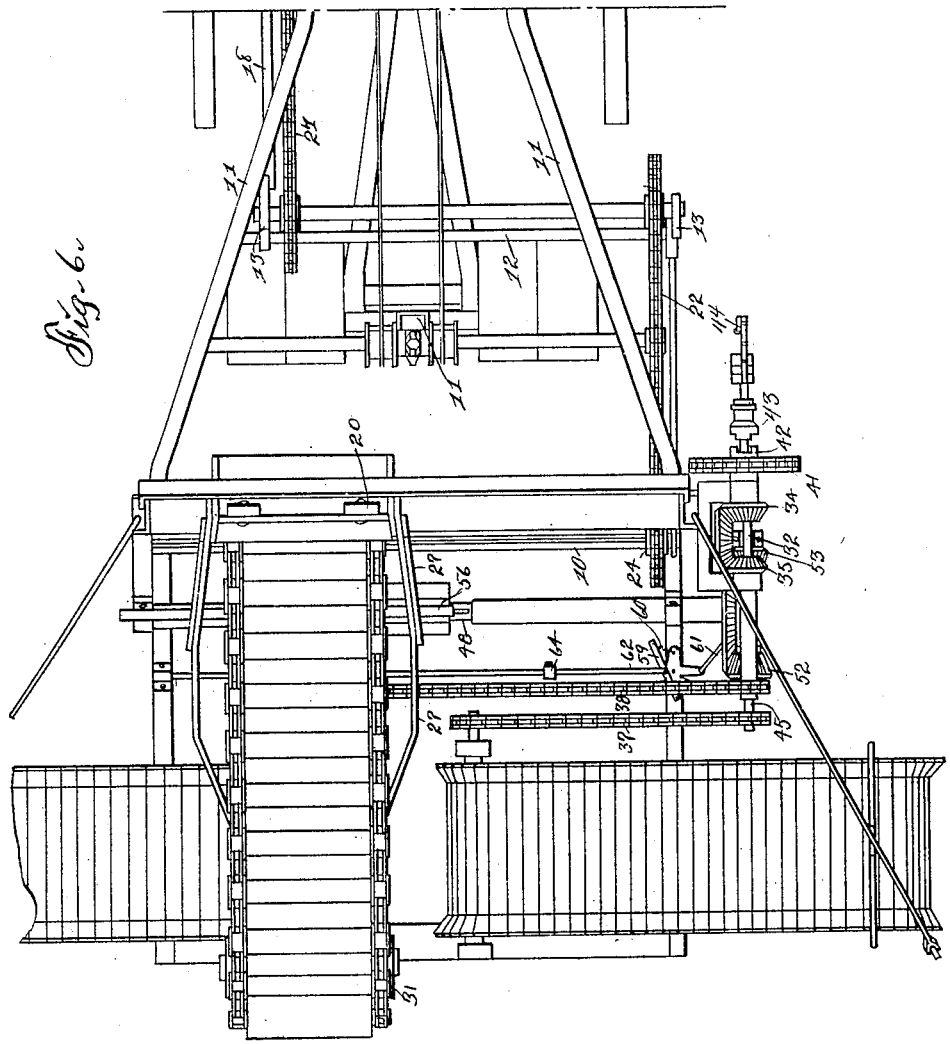

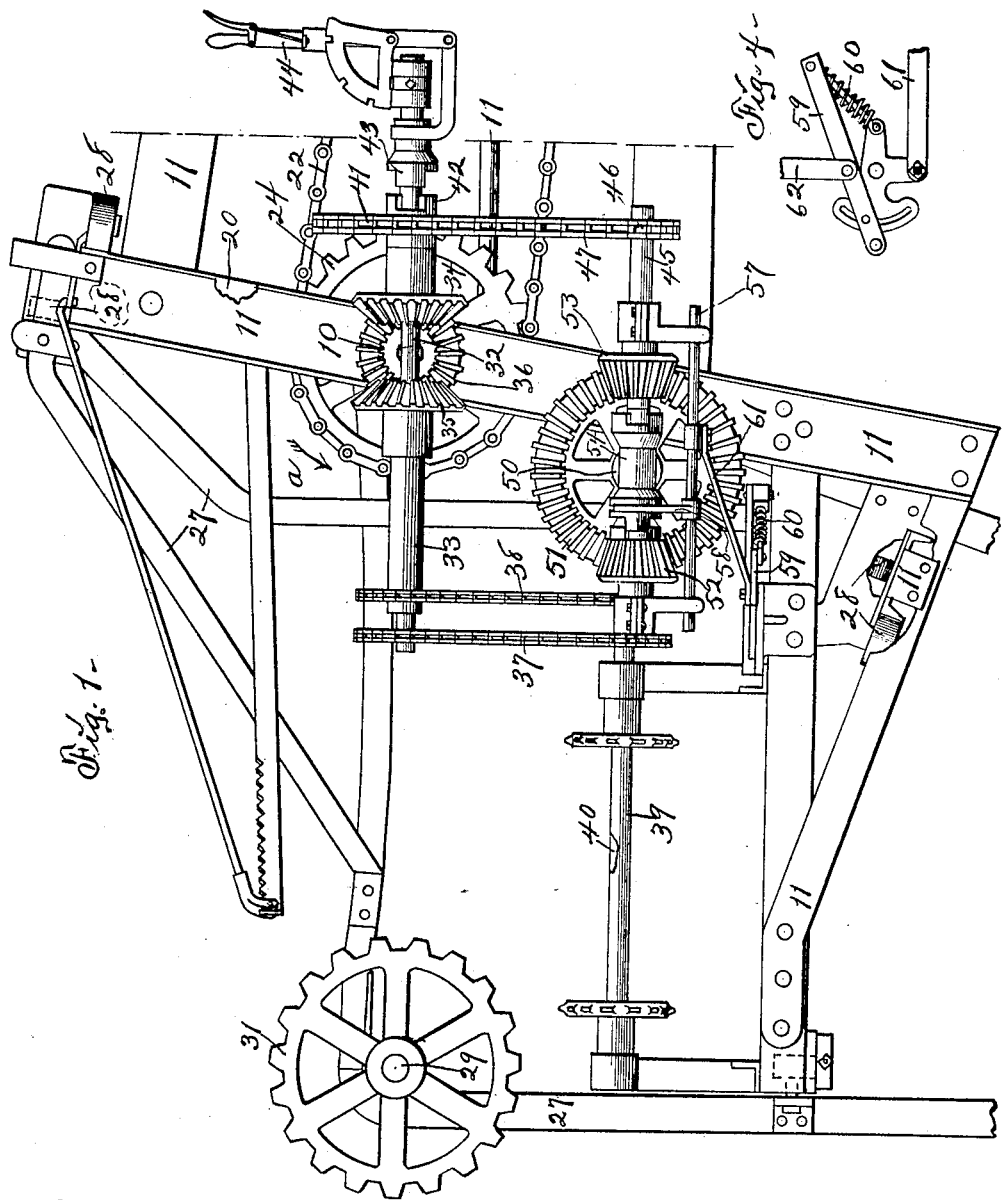

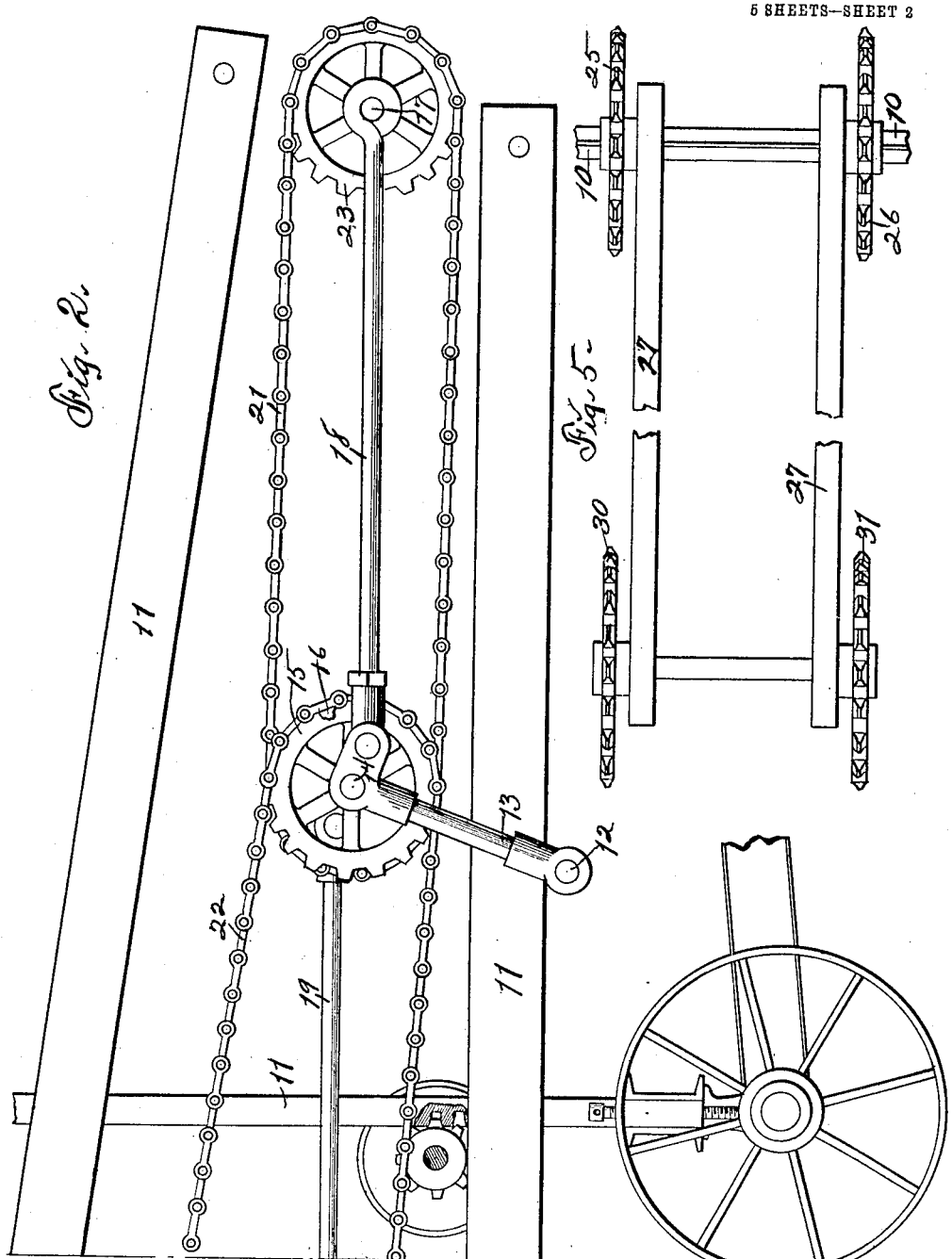

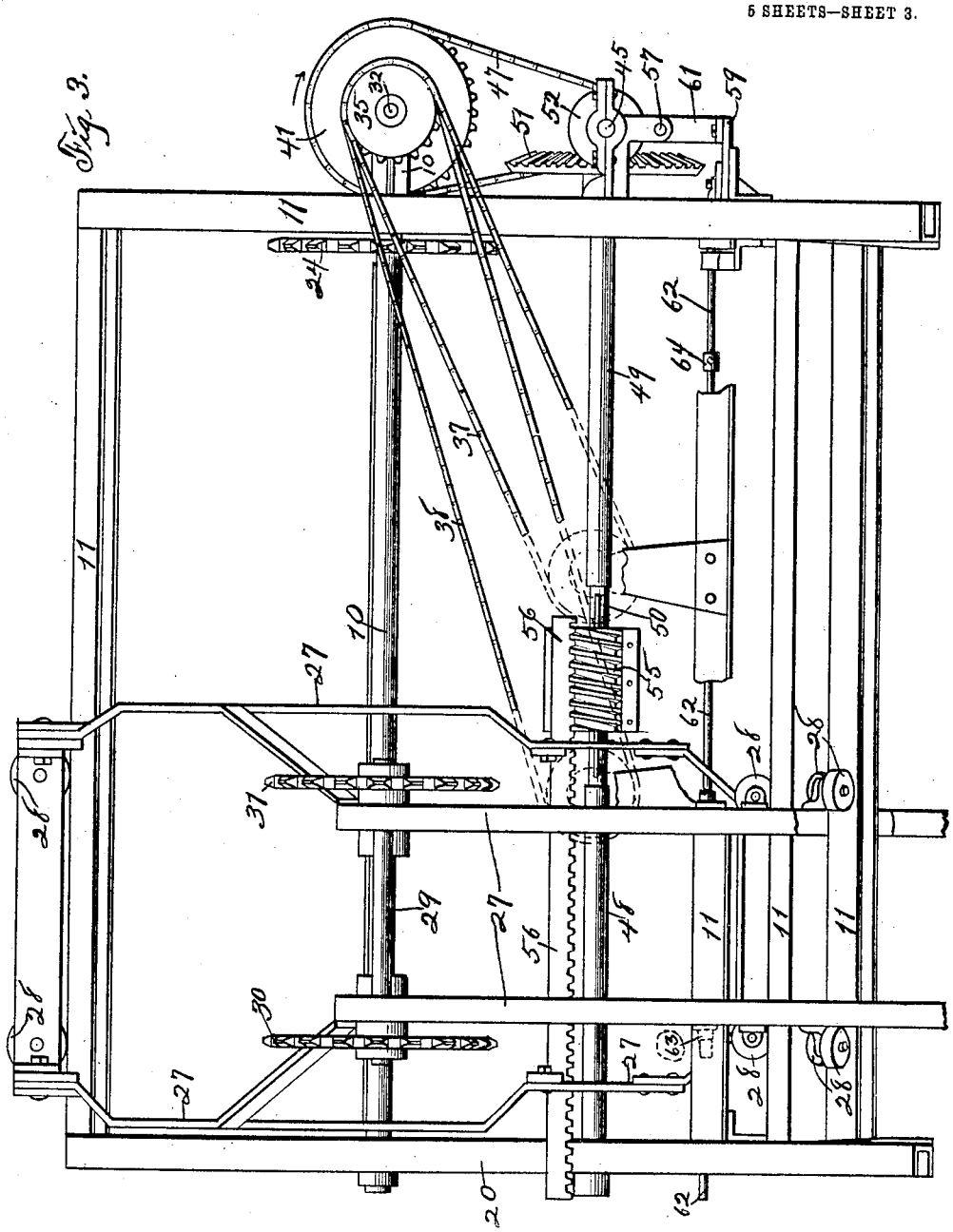

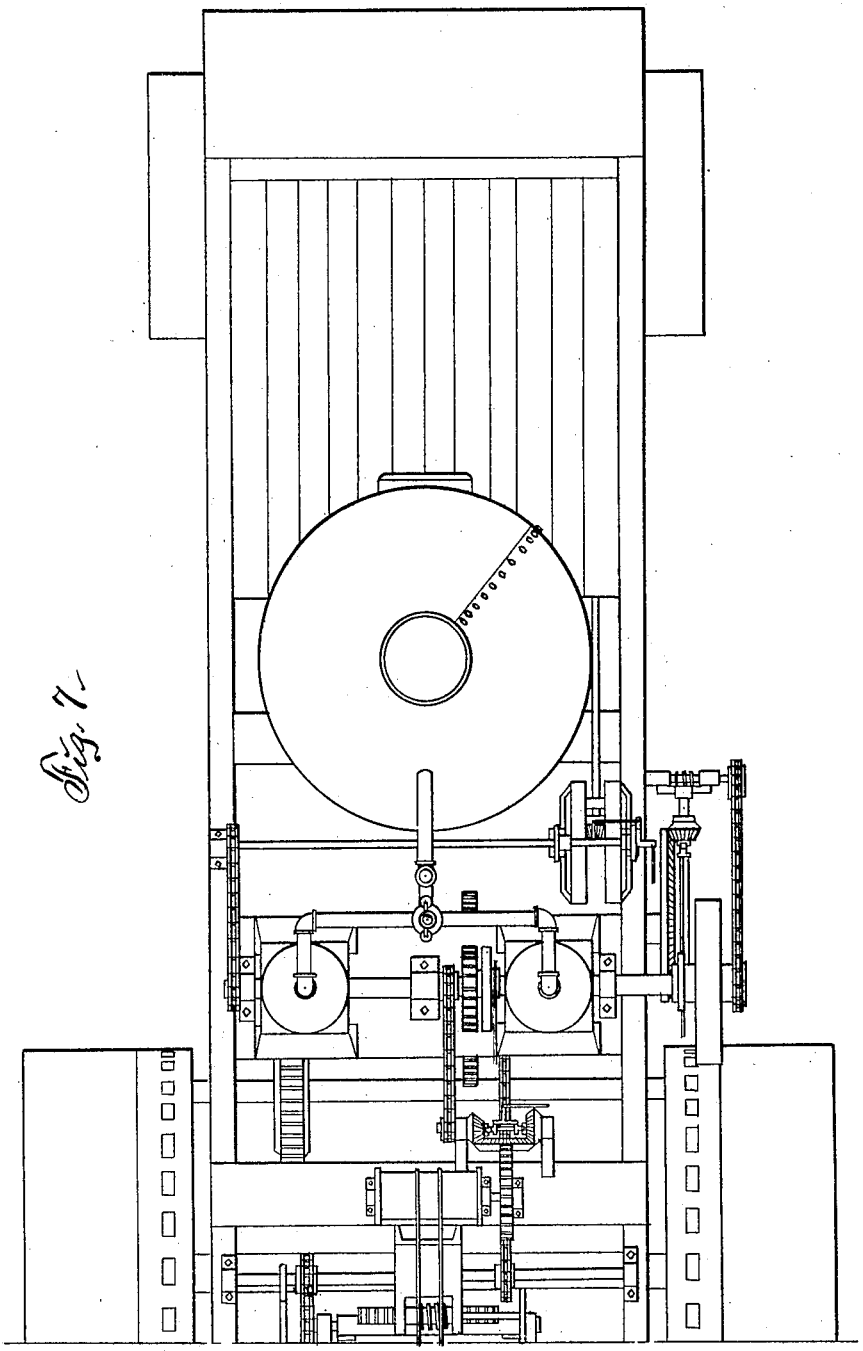

UNITED STATES PATENT OFFICE.

GEORGE W. PARSONS, OF NEWTON, IOWA, ASSIGNOR TO THE G. W. PARSONS COMPANY, OF NEWTON, IOWA, A CORPORATION OF IOWA.

TRENCH-EXCAVATOR.

No. 906,655.  Specification of Letters Patent.  Patented Dec. 15, 1908.

Application filed September 25, 1906. Serial No. 336,645.

*To all whom it may concern:*

Be it known that I, GEORGE W. PARSONS, a citizen of the United States of America, and resident of Newton, Jasper county, Iowa, have invented a new and useful Trench-Excavator, of which the following is a specification.

This invention relates to and is an improvement on the machine described in my application for Letters Patent of the United States filed March 5, 1906 and serially numbered 304,197.

The object of this invention is to provide means for moving excavating mechanism laterally of the path of travel of a machine carrying said mechanism.

A further object of this invention is to provide means for moving excavating mechanism to and fro on right lines transversely of the path of travel of a machine carrying said mechanism.

A further object of this invention is to provide means for moving excavating mechanism to and fro on right lines transversely of the path of travel of a machine carrying said mechanism, such to and fro movements being intermittent and rapid and alternating with periods of cessation in which the excavating mechanism continues its functions of cutting and elevating earth.

Further objects of this invention will appear in the specific description and claims thereof.

My invention consists in the construction, arrangement and combination of elements hereinafter set forth, pointed out in my claims and illustrated by the accompanying drawing, in which—

Figures 1 and 2 are mating portions of a side elevation of a machine embodying my improvements. Fig. 3 is a rear elevation of the same. Fig. 4 is a detail plan of a tripping mechanism. Fig. 5 is a plan showing that portion of the excavating frame which carries the wheels for supporting and driving the excavator. Figs. 6 and 7 are mating portions of a plan of the machine.

In the construction of the improvements, and their application to the supporting, driving and excavating mechanisms as shown, the numeral 10 designates a main shaft mounted for rotation in and extending horizontally transversely of a main frame 11. The main frame may be of any desired and suitable construction and consists of a plurality of beams, yokes, bars, braces, rods and similar structural elements which may be varied in size shape and arrangement, and form, as to detail, no part of my present invention except as they serve to support the operating mechanisms. The frame 11 preferably is mounted on trucks, one of which is a tractor and is driven by a prime mover (not shown) also carried by said frame. The frame 11 also carries a transverse rod 12 on which are pivoted bearing arms 13 connected at their upper ends by a journal 14 carrying sprocket wheels 15, 16. A journal or shaft 17 is mounted for rotation in the frame 11 in front of the journal 14 and is driven by the prime mover (not shown) in a given direction. Rods 18, 19 connect the journal 17 to the bearing arm 13 and the bearing arm to a post 20 of the main frame 11, in such manner that sprocket chains 21, 22 connecting a wheel 23 on the journal 17 to the wheel 16 and connecting the wheel 15 to a wheel 24 on the main shaft 10, may flex relative to each other and run properly at all times to transmit power from the shaft 17 to the main shaft.

Sprocket wheels 25, 26 are mounted for travel longitudinally of and rotation with the main shaft 10 and serve as driving wheels for an endless excavating mechanism (not shown) fully illustrated and described in the application to which reference is above made.

A minor frame, hereinafter referred to as the excavator frame 27, is provided within and of materially less width than the main frame. The frame 27 is composed of a plurality of connected beams, bars, rods and braces that may vary in size, shape and arrangement as desired, and is provided with rollers or antifriction wheels 28 engaging at desired places with tracks and bars of the main frame 11 for the purpose of suspending and supporting said excavator frame for travel with and transversely of the main frame. The excavator frame 27 carries a shaft 29 in its rear upper portion and idler sprocket wheels 30, 31 on said shaft also engage, support and guide the excavating mechanism (not shown).

A countershaft 32 is mounted for rotation in bearing on the main frame 11 and a sleeve 33 is mounted for rotation on one end portion of said countershaft. Bevel gears 34, 35 on the countershaft 32 and sleeve 33, respectively, engage diametrically opposite each other with a common bevel gear 36 on a projecting end portion of the main shaft. The countershaft 32 and sleeve 33 are connected by sprocket gearing 37, 38, respectively, to driving shafts 39, 40 of lateral conveyers (not shown) whereby earth raised by the excavating mechanism may be carried laterally and away from the machine. A sprocket wheel 41, formed with a clutch member hub 42 is mounted loosely on the countershaft 32 and a clutch member 43, splined to said shaft and controlled by a hand lever 44, may be moved into engagement with the hub 42 to connect said wheel to the countershaft. A countershaft 45 is journaled in bearings on the main frame 11 below and parallel with the countershaft 32 and a sprocket wheel 46 thereon is connected by a chain 47 to the wheel 41. Sleeves or elongated bearings 48, 49 are mounted in alinement with each other on the main frame 11 below and parallel with the main shaft 10 and a shifting shaft 50 is mounted for rotation in said sleeves. A bevel gear 51 is mounted on a projecting end portion of the shifting shaft 50 and meshes, at diametrically opposite points, with bevel gears 52, 53 loosely mounted on the countershaft 45. Each of the gears 52, 53 is formed with a clutch member hub, and a double-ended clutch member 54 is splined to the countershaft 45 between said gears. It is the function of the clutch member 54 to engage the gears 52, 53 alternately and connect said gears to the countershaft 45. A worm 55 is splined to the central portion of the shifting shaft 50, between adjacent ends of the sleeves 48, 49, and said worm engages a rack 56 rigidly mounted on and extending transversely of the excavator frame 27. A rod 57 is mounted for rectilinear reciprocation in the bearings employed to support the countershaft 45 and a yoke 58 connects said rod to the clutch member 54 in such manner that said clutch member is moved longitudinally of said countershaft by said rod. A lever 59 is fulcrumed on the frame 11 beneath the gear 51 and is spring-drawn and spring-held by a retractile spring 60 in either direction past a dead center. The outer portion of the lever 59 is connected by a rod 61 to the rod 57 and the inner portion of said lever is connected pivotally to one end portion of a tripping bar 62, which bar is mounted for rectilinear reciprocation in bearings in the main frame 11 and is parallel to the shifting shaft 50. Stops 63, 64 (Fig. 3, one dotted) are mounted on and adjustable longitudinally of the tripping bar 62. The tripping bar 62 extends through slide bearings on the excavator frame 27 and the stops 63, 64 on said bar are located at the opposite limits of lateral movement of said frame.

The parts being in the positions shown in Fig. 3 and the main shaft 10 rotated in the direction of the arrow $a$ in Fig. 1, the excavator operates to cut and elevate earth from a trench of a width approximately equal to the width of said excavator. When it is desired to cut a trench of greater width, instead of substituting a wider excavator or traversing the same path more than once with the machine, the following described operation is followed: The stops 63, 64 are adjusted and the hand lever 44 is actuated to engage the clutch member 43 with the member 42, thus rotating the clutch member 54, spring-held in engagement with the gear 52, and thereby rotating said gear, the gear 51, shifting shaft 50 and worm 55. The worm rotates idly in mesh with the rack 56 until said worm is moved along the shifting shaft into engagement with the sleeve 48, such movement of the worm along the shaft caused by the inertia of the rack and the excavator frame and its load. But when the worm contacts with the sleeve 48 fixed in the main frame 11 such inertia is overcome and the rack, excavator frame, wheels 25, 26, 30, 31, and load thereon are moved laterally toward the stop 64. When the frame 27 strikes the stop 64 it moves said stop and the tripping bar 62 outward and causes the latter to shift the lever 59 past the center to the end that the spring 60 may further move said lever and disengage the clutch member 54 from the gear 52 and engage it with the gear 53. Then the movement of rotation of the gear 51, shifting shaft 50 and worm 55 are reversed, and said worm runs idly in mesh with the rack 56 until it is moved longitudinally of the shifting shaft into engagement with the sleeve 49. When the worm 55 engages the sleeve 49 it starts a reverse lateral movement of the rack 56, excavator frame 27 and its load, and maintaining such movement until the said frame engages the stop 63 and moves the tripping bar 62 back to its initial position, thus tripping the clutch member 54 out of engagement with the gear 53 and into engagement with the gear 52 and again establishing the initial movement of the shifting shaft, gear 50 and worm.

The described periods of inertia of the excavator frame 27 are desirable in that they provide a space or time at each lateral shifting in which the excavator may cut clean the adjacent side or wall of a trench. Through the use of the automatic reversing mechanism a trench may be cut of any desired width, within certain limits, or the line of the trench may be changed without altering the machine or the direction of travel thereof.

I claim as my invention—

1. In a trench excavator, a truck frame, an excavator frame mounted thereon, and means for automatically moving the excavator frame to and fro on right lines transversely of the truck frame.

2. In a trench excavator, an excavator frame, shifting mechanism connected with said frame, and means acted on by said frame for reversing said shifting mechanism.

3. In a trench excavator, an excavator frame, shifting mechanism connected with said frame, and tripping means acted on by said frame for reversing said shifting mechanism.

4. In a trench excavator, an excavator frame, shifting mechanism connected with said frame, and adjustable tripping mechanism acted on by said frame for reversing said shifting mechanism.

5. In a trench excavator, an excavator frame mounted for lateral movement, shifting mechanism connected with said frame and adapted to move it in either direction, and means acted upon by said frame for reversing said shifting mechanism.

6. In a trench excavator, an excavator frame mounted for lateral movement, shifting mechanism connected with said frame and adapted to move it in either direction, and tripping means acted upon by said frame for reversing said shifting mechanism.

7. In a trench excavator, an excavator frame mounted for lateral movement, shifting mechanism connected with said frame and adapted to move it in either direction, and adjustable tripping mechanism acted upon by said frame for reversing said shifting mechanism.

Signed by me at Des Moines, Iowa, this twenty ninth day of August, 1906.

GEORGE W. PARSONS

Witnesses:
S. C. SWEET,
N. W. WINTERS.